May 16, 1939.　　　C. M. NEVIUS　　　2,158,587
COFFEE BREWING DEVICE
Filed Dec. 28, 1936　　　3 Sheets-Sheet 1
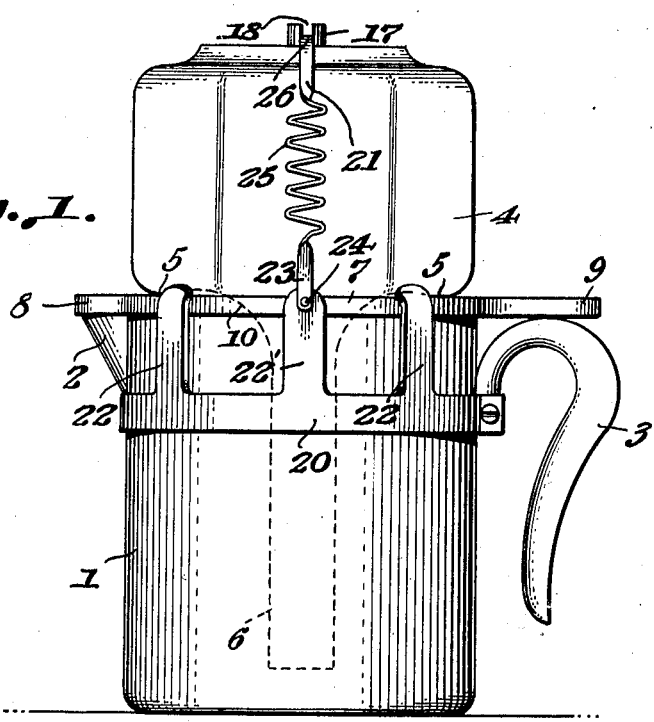
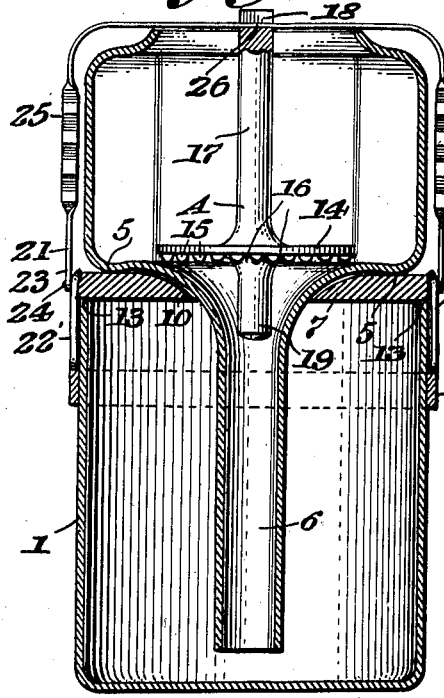
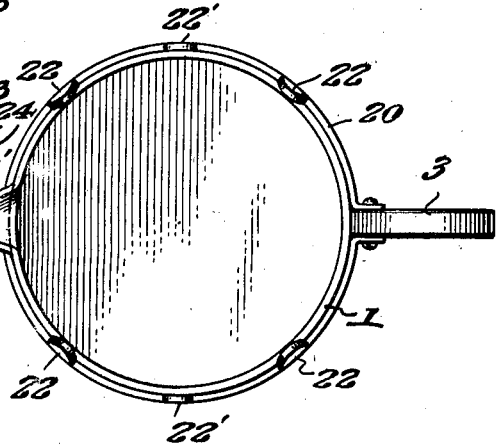
INVENTOR.
C. M. Nevius,
BY
ATTORNEY.

May 16, 1939.  C. M. NEVIUS  2,158,587
COFFEE BREWING DEVICE
Filed Dec. 28, 1936   3 Sheets-Sheet 2
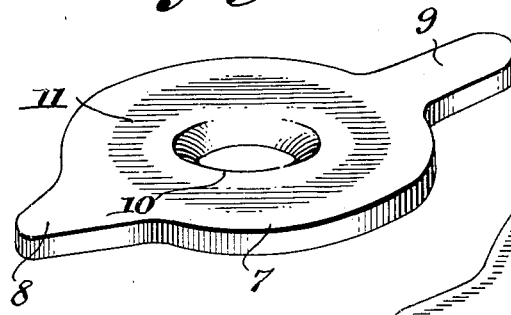
Fig. 4.
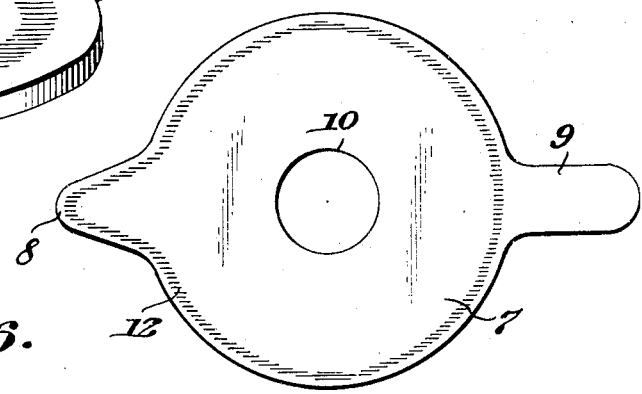
Fig. 5.
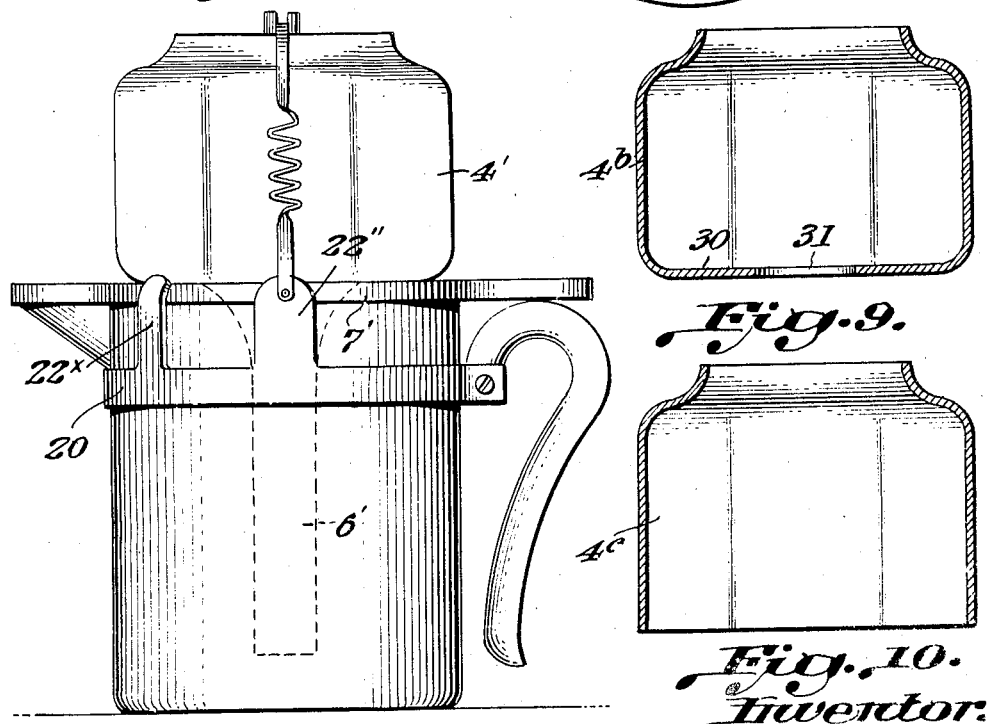
Fig. 6.
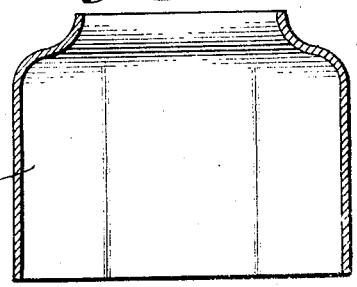
Fig. 9.
Fig. 10.
Inventor:
C. M. Nevius,
By [signature] Atty.

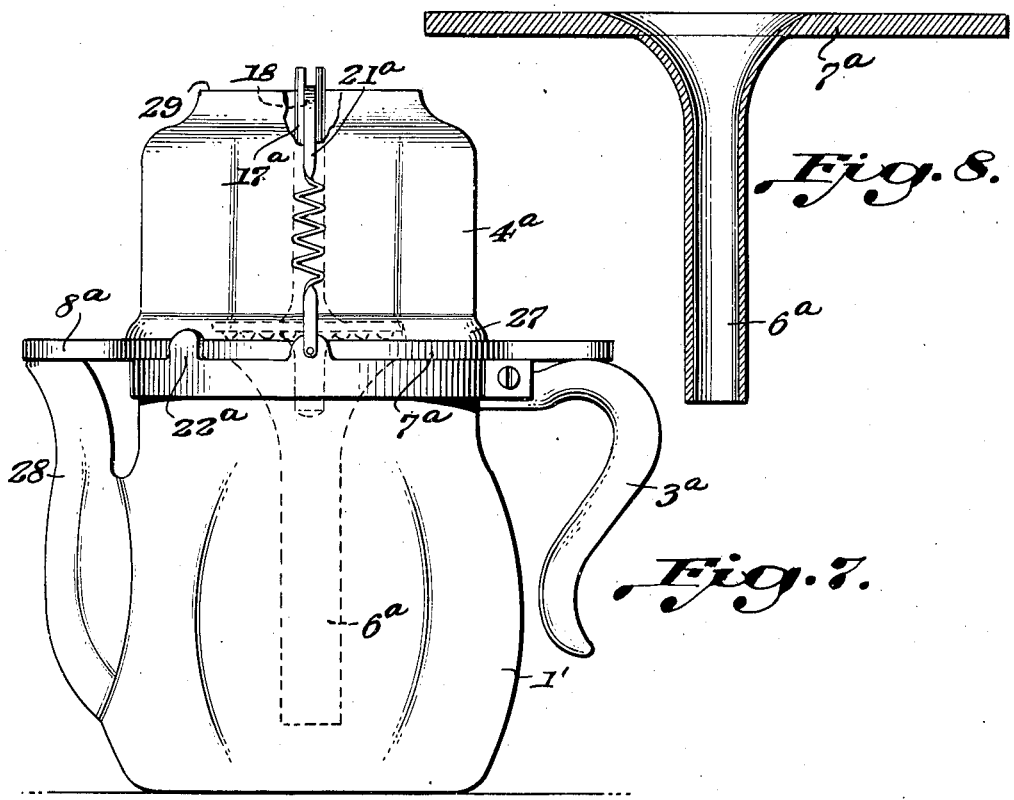
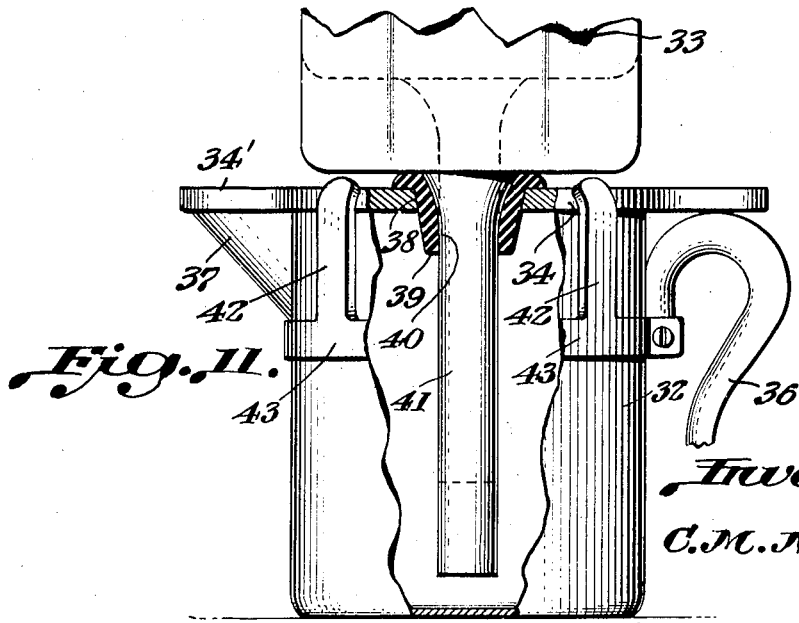

Patented May 16, 1939

2,158,587

UNITED STATES PATENT OFFICE 2,158,587

COFFEE BREWING DEVICE

Condict M. Nevius, Hornell, N. Y.

Application December 28, 1936, Serial No. 117,928

23 Claims. (Cl. 53—3)

This invention relates to coffee brewing devices.

In some coffee brewing devices, embodying upper and lower receptacles having filtering communication, water is placed in the lower receptacle and the upper receptacle is positioned on the lower receptacle. Coffee grounds are placed in the upper receptacle and heat is applied to the bottom of the lower receptacle until steam pressure is generated to force the water to the upper receptacle where the brewing is accomplished, and after which heating is discontinued, resulting in condensation in the lower receptacle and creating a vacuum which forces the coffee fluid back into the lower receptacle by atmospheric pressure.

Sometimes the coffee grounds are placed in the upper receptacle and hot water is poured on the coffee grounds, with the result that the coffee fluid is permitted to drip through the filtering communication between the receptacles to the lower receptacle, enriched and strong in flavor as when the coffee is brewed under the first-mentioned method.

Under either of the above methods, after the brewing of the coffee has been completed, it has been necessary with coffee brewing devices of this general type to remove the upper brewing receptacle from the lower receptacle in order to serve the coffee. There has been some reluctance on the part of users to adopt the present methods of brewing coffee because of the necessity of removing the upper receptacle during the preparation of or during the serving of a meal. Therefore, one of the primary objects of the present invention is to do away with the necessity of removing the upper brewing receptacle from the lower receptacle to permit pouring of the coffee from the lower receptacle.

Another object of the invention resides in the provision of a coffee brewing device embodying upper and lower receptacles and a rotatable or otherwise movable sealing member interposed between the receptacles and with which the receptacles have sealing contact during the brewing process and which are restrained against separation either during the brewing process or when pouring the brewed coffee.

Another object of the invention is to provide a coffee brewing device including upper and lower receptacles, the latter having a pouring means, and a movable member interposed between the receptacles and with which the receptacles each have a continuous sealing contact during the brewing process, and said member at the same time covering the mouth of the pouring means and being movable relatively to one or both of the receptacles to uncover the pouring means to permit pouring of the brewed coffee without breaking the continuous contacting sealing relation between the receptacles and said sealing member 5 otherwise than at the pouring means.

Another object of the invention is to provide the upper and lower receptacles and the intermediate sealing member with smooth, effectively engageable sealing surfaces so that, when the receptacles and the sealing member are made of vitreous or similar materials, there will be little or no danger of scratching or chipping of the engaging parts.

Another object of the invention resides in the provision of a coffee brewing device including upper and lower receptacles and a sealing member movably interposed between the receptacles and associated therewith in a maner to provide for brewing either by gravity drip from the upper receptacle or by vacuum extraction from the same.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Fig. 1 is a side elevation of the invention.

Fig. 2 is a vertical sectional view, the filtering means being shown partly in elevation and partly in section.

Fig. 3 is a top plan view of the lower receptacle.

Fig. 4 is a perspective view of the intermediate sealing member.

Fig. 5 is a top plan view of the under side of the sealing member.

Fig. 6 is a vertical sectional view of a modified form of the invention, with parts removed, illustrating a form of the invention wherein the upper brewing receptacle and the intermediate sealing member are rigidly connected together.

Fig. 7 is an elevation of another modified form of the invention.

Fig. 8 is a vertical sectional view of the sealing members.

Fig. 9 is a modified form of upper receptacle.

Fig. 10 is a still further modification of the upper receptacle.

Fig. 11 is a modified form of coffee brewing receptacle showing adjustments in dotted lines of the upper receptacle with relation to the lower receptacle.

Referring now more particularly to the accompanying drawings, in which some embodiments of the invention are illustrated, and referring more particularly first to the form of invention illustrated in Figs. 1 to 5, inclusive, the reference character 1 indicates a lower receptacle of any suitable shape and composed of any suitable material, constituting in itself a coffee pot having an open top, a pouring orifice, a pouring lip or other suitable pouring means 2, and a handle 3 of any suitable character. In the use of the term "pouring means" I wish it understood at the outset that the term is used in a generic sense to comprehend such outlets as may be termed "orifices", "lips", "spouts" or the like.

An upper coffee brewing receptacle is designated by the reference numeral 4. This upper receptacle may be of any suitable shape and it may be composed of any suitable material and it may be of any suitable size or capacity desired and it has an open top. The upper brewing receptacle is preferably of smaller capacity than the lower receptacle. The sizes of both receptacles may be varied according to requirements, desires or needs.

The bottom of the upper brewing receptacle has an annular bearing surface 5 and a depending open-ended tube 6 formed integral with the upper receptacle and which projects downwardly into the lower receptacle to near the bottom of the latter. While this open-ended tube 6 is shown in this form of the invention as cylindrical in cross section it may be of other form in cross section.

An intermediate sealing member 7 is interposed between the upper and lower receptacles. It is preferably relatively thin and flat and rests upon the top of the lower receptacle, the upper receptacle resting upon the same. This intermediate sealing member 7 is of substantially disc form and it is composed of any suitable material. It has a projecting substantially triangular or other shaped projecting portion 8 which is adapted to close the mouth of the pouring means 2 during the brewing process and adapted to uncover the mouth of the pouring means when pouring coffee. The intermediate sealing member also has a handle portion 9 of any suitable character to facilitate a rotative or other movement of the same on the lower receptacle or to facilitate a rotative movement of the same relative to both of the receptacles.

The intermediate sealing member 7 may be of a shape other than of substantially disc formation. In any event, it has a substantially central opening 10 through which the open-ended tube 6 of the upper receptacle extends. This sealing member 7 has an annular plane surface 11, as indicated by shade lines in Fig. 4. This annular plane surface is of a width substantially the same as the width of the bearing surface 5 at the bottom of the upper receptacle 4 and this annular surface 11 cooperates with the bearing surface 5 for sealing purposes. Both of these bearing surfaces may be ground or lapped surfaces, depending upon the nature of the materials of which the upper receptacle and sealing member are composed, and especially if composed of glass or other vitreous surfaces.

The under surface of the intermediate rotative sealing member 7 has a continuous plane bearing surface as indicated by shade lines at 12 in Fig. 5. This plane bearing surface 12 is adapted to coact with the continuous plane surface 13 formed at the upper rim edge of the lower receptacle. These bearing surfaces 12 and 13 may be ground or lapped, if desired, for effective sealing bearing contact with relation to each other, according to the materials of which the lower receptacles and intermediate sealing member are composed and especially if composed of glass or other vitreous materials.

A filtering device of any suitable character is disposed at the communication between the upper and lower receptacles. Any suitable filtering means may be employed. For illustrative purposes, one form of filtering device is indicated generally by the reference letter A and consists of a disk 14 having on its under side small spaced close together, radially disposed ribs 15, forming narrow passages 16.

The filter disk 14 lies on the bottom of the upper brewing receptacle with the ribs 15 of the disk resting on the bottom wall of the upper receptacle 4. The passages 16 at the under side of the disk permit of the passage of steam and coffee fluid from one receptacle to the other but they are arranged sufficiently close together to prevent passage of coffee grounds from the upper receptacle to the lower receptacle. As stated, this particular form of filtering means is disclosed primarily solely for the purposes of illustration and it is to be understood that other suitable character of filtering means may be employed for the purposes accomplished by the particular filtering device illustrated.

A vertical stem 17 rises preferably substantially centrally from the disk 14 and extends upwardly slightly beyond the open top of the upper brewing receptacle and at its upper extremity has a notch 18. A short stem 19 extends substantially centrally from the under side of the filter disk 14 for readily centering the filtering disk in position. This short stem 19 is adapted to enter the upper end of the open-ended tube 6 and is of smaller cross sectional diameter than the tube so as to provide for and not interfere with a passage of fluid to and from the upper receptacle through the tube.

To hold the upper and lower receptacles in relative positions against lateral displacement, and to prevent lateral separation of these parts when pouring coffee, and thereby obviate the necessity of removing or holding the upper receptacle by hand when pouring the brewed coffee, and also to prevent dislodgment of the filter device illustrated, I provide suitable means for holding the parts together in cooperative relation both at the time of brewing coffee and at the time of pouring coffee. Various means may be employed for this purpose, and I wish not to be limited to any particular means, but, for purposes of illustration, one form of means for this purpose is shown in the accompanying drawings and includes a band 20 to which a tensioned bail 21 is secured. The band 20 is secured to the lower receptacle 1 below the plane of the mouth of the pouring means 2. The handle 3 of the lower receptacle may be rigidly secured to this band 20, if desired.

The band 20 has spaced, resilient or yieldable lugs 22 which extend upwardly therefrom in overlapping relation with the edge of the intermediate sealing member 7 and which at their upper ends are curved slightly inwardly over the top face of the intermediate sealing member 7. These lugs 22 being resilient or yieldable permit the sealing member 7 to be sprung into position on the upper edge of the lower receptacle. The open-ended tube 6 carried by the upper brewing receptacle, fitting in the opening 10 of the intermediate member 7, holds the upper receptacle against lateral movement with relation to the lower receptacle while the lugs 22 hold the intermediate member against lateral displacement with relation to the lower receptacle 2.

The bail 20 has the free ends of its legs 23 connected to a pair of lugs 22' of said band in any suitable manner, as, for instance, in the eyes 24 of the respective lugs. The closeness of the lugs 22 and 22' of the band 20 with the marginal edge of the intermediate sealing member will depend upon the thickness of the lower receptacle walls. Where the bail is used it is desired that the legs of the bail come as close to the side walls of the upper brewing receptacle as possible.

Wave springs 25 are formed in the legs 23 of the bail 21 and the bight portion 26 of the bail engages in the aforesaid notch 18 of the stem 17 of the filtering device, whereby, as the result of tension, incident to said wave springs 25, the bight portion of the bail presses tightly in the bottom of the notch 18 and effects a positive holding of the filter firmly on the bottom of the upper receptacle to prevent dislodgment of the filter and whereby the receptacles and the intermediate sealing member and filter are positively held or retained in effective operative sealing relation during coffee brewing periods as well as positively held against accidental lateral displacement of one element with relation to another during the brewing process, and particularly held in such a manner as to prevent breaking of the aforesaid sealing contact engagements between the receptacles and the intermediate sealing member. This holding means insures a tight operative connection between the upper and lower receptacles and the intermediate sealing member at all times. It is to be understood that the wave springs 25 may be eliminated and the bail constructed to possess sufficient resiliency in itself as to enable the bight portion of the bail to be readily sprung into and out of the notch 18 of the stem 17 of the filtering device.

When the parts are thus assembled together and irrespective of the tension of the bail in holding the various elements together, the rotatable sealing member 7 may be rotated within the spaced lugs 22 of the band 20 and whether the upper receptacle moves with the intermediate sealing member 7 as the latter is given rotative movement or whether it remains stationary with relation thereto there is always a relative movement of the intermediate member with relation to the lower receptacle.

In another embodiment of the invention, and as shown in Fig. 6 of the accompanying drawings, the upper receptacle 4' may be rigidly secured to the intermediate sealing member 7' by fusing or otherwise, in which event, the upper part of the brewing device may be said to be composed of the upper brewing receptacle 4' and the tube 6' and the sealing member 7' with the latter having its under face effecting the sealing connection with the lower receptacle as previously described. The lugs 22 of the form first described and illustrated as next to the handle 3 are eliminated from the form shown in Fig. 6, in which latter form the tube 6' may be positioned in the lower receptacle and the upper receptacle 4' and sealing member 7' slid transversely across the top of the lower receptacle between the lugs 22" and under the inturned upper ends of the lugs 22ˣ, thereby holding the parts effectively together during the brewing period and at time of pouring coffee.

In another embodiment of the invention, and as illustrated in Figs. 7 and 8 of the accompanying drawings, the sealing member 7ª may carry the open-ended tube 6ª, the latter being rendered rigid with the former by fusing or otherwise. How the connection is made between the sealing member 7ª and the tube 6ª is immaterial so long as an effective rigid connection is effected and so long as the tube 6ª is open-ended and at its upper end opens through the sealing member 7ª. In this form of the invention, the base portion of the upper receptacle 4ª is altered as compared with the base portion of the upper receptacle first described. For instance, the upper receptacle 4ª may be open throughout the entire bottom area thereof, the side walls of the upper receptacle 4ª terminating at the lower edge thereof in an outwardly flared annular base flange 27 adapted to rest upon and have continuous sealing contact with the upper face of the sealing member 7ª.

In this form of the invention the upper receptacles may be of any shape or form, but as illustrated both the upper and lower receptacles are of a different form from that first described and illustrated. The lower receptacle 1' has an upwardly directed spout 28 which has its upper discharge mouth disposed in a plane with the horizontal plane of the upper edge of the lower receptacle 1' so as to be covered and uncovered by the projecting portion 8ª of the sealing member as in the use of the projecting portion 8 which covers and uncovers the mouth of the pouring spout 2 in the first form described. In this modified form of the invention, the filtering means might be the same as the filtering means previously described except that it would rest directly upon the upper face of the sealing member 7ª rather than upon the bottom of the upper receptacle. In this modified form of invention illustrated in Figs. 7 and 8, the notch 18ª in the stem 17ª is preferably made deeper than the notch 17 in the first form described so as to permit the bight portion of the bail 21ª to lie above the bottom of the notch and permit the bight portion of the bail to engage tightly on the flanged edge 29 of the upper receptacle at the open top of the latter to hold the parts together for brewing or pouring purposes.

In the form of invention illustrated in Figs. 7 and 8 a fewer number of resilient or yieldable lugs 22 are used than the number of such lugs used in the first form described. For instance, the opposite lugs 22 next the handle of the first form described are eliminated so as to permit the intermediate sealing member 7ª to have a sliding movement over the top of the lower receptacle from the handle 3ª to the pouring means 28 between the lugs 22ª when positioning the upper receptacle carrying the sealing member rigidly therewith in operative position on the lower receptacle between said lugs as distinguished from a downward position of the sealing member 7 onto the lower receptacle 1 to position the sealing member on the lower receptacle as in the first form described.

In Fig. 9 there is illustrated another form of upper receptacle 4ᵇ in which the receptacle is substantially the same as that illustrated in Figs. 7 and 8 but wherein the upper receptacle 4ᵇ has a bottom 30 provided with an opening 31. This form of upper receptacle is to be used in a structure wherein the open-ended tube is formed rigidly with the intermediate sealing member as in the form of invention illustrated in Figs. 7 and 8.

In Fig. 10 is illustrated another form of upper brewing receptacle as indicated at 4c and which is the form of upper receptacle to be used where the intermediate sealing member carries the open-ended fluid conveying tube and in connection with which further description would seem entirely unnecessary in view of the description given of Figs. 7, 8 and 9.

In Fig. 11 is illustrated another form of invention in which there is employed upper and lower receptacles as hereinbefore described and in which there is provided an adjustable connection between the receptacles as regards an axial separation of the receptacles without breaking an effective sealing connection during the brewing process irrespective of the degree of adjustment or when pouring the coffee. For instance, the lower receptacle is indicated at 32 and the upper receptacle denoted by the reference character 33. Interposed between the receptacles is a sealing member 34 of the same shape as that shown in Figs. 4 and 5. The lower receptacle may have a handle 36 of any suitable character and it also has a pouring means 37 which is covered and uncovered by the extension 34' of the sealing member 34, the latter being rotatable on the lower receptacle 32. The sealing member has a substantially centrally disposed opening 38 in which is disposed a rubber, fibrous or composition type of gasket 39 having a bore 40 through which the tube 41 extends in tight, frictionally slidable engagement with the wall of the bore to provide for a sealed connection between the upper and lower receptacles as well as to provide for adjustable elevated positions of the upper receptacle with relation to the lower receptacle without disrupting or breaking the sealed connection between the receptacles and without dislodging the sealing member 34 which is held on the lower receptacle by means of the yieldable fingers 42 of the band 43 coacting with the sealing member as after the manner shown in Figs. 6 and 7 or as shown in Fig. 1.

The tube 41 having tight frictional sliding fit in the gasket 39, the upper receptacle may be readily supported at different positions axially with relation to the lower receptacle. This arrangement permits, if desired, the use of an upper receptacle considerably smaller in proportion to the lower receptacle than in the arrangements previously described and brewing of the coffee may be accomplished with less water. The dotted line position of the upper brewing receptacle provides for a maximum quantity of brew, the full line position of the upper and lower receptacles providing for a minimum brew of coffee.

It will be understood that in the structure illustrated in Fig. 11, a suitable filtering device is used, but the same is not illustrated for sake of clearness.

What is claimed is:

1. A steam, vacuum coffee brewing device comprising a lower receptacle open at the top and provided with a pouring means, an upper brewing receptacle communicating with the lower receptacle, and an intermediate member movably interposed between said receptacles having means to cover and uncover the pouring means of the lower receptacle and having continuous sealing contact with said receptacles during the brewing process whereby the pouring means may be uncovered after the brewing process to permit of pouring from the lower receptacle without removing the upper receptacle.

2. A coffee brewing device comprising a lower receptacle open at the top and provided with a pouring means open at said top, an upper brewing receptacle having means providing for two-way liquid communication with the lower receptacle, an intermediate member movably in sealing contact with both of said receptacles and having a projection normally overlying and sealing the mouth of the pouring means during the brewing process and movable away from the mouth of the pouring means to permit pouring of the brewed coffee without shifting the sealing contact surfaces out of contact with each other except at the mouth of the pouring means and means to yieldingly compress the said receptacles and intermediate member into sealing engagement.

3. A coffee brewing device comprising a lower receptacle open at the top and provided with a pouring means, an upper brewing receptacle having communication with the lower receptacle, an intermediate member movably interposed between said receptacles and having continuous sealing contact on opposite sides thereof with said receptacles during the brewing process, said intermediate sealing member having a projection extending normally over and sealing the mouth of the pouring means to seal the latter during the brewing process, and means to yieldingly compress the said receptacles and said intermediate member into sealing engagement said sealing member being movable to move said projection from over the mouth of the pouring means while at the same time preserving sealing contact of the remainder of the lower receptacle and the upper receptacle with said member.

4. A coffee brewing device comprising a lower receptacle open at the top and provided with a pouring means, an upper brewing receptacle having a depending tubular member establishing communication with the lower receptacle, an intermediate member rotatably interposed between said receptacles around said tubular member with its upper and lower surfaces in sealing contact therewith and having a projection to seal the mouth of the pouring means during the brewing process and to uncover the pouring means upon rotative movement of said member in one direction and means to yieldingly compress the said receptacles and said intemediate member into sealing engagement.

5. A coffee brewing device comprising a lower receptacle open at the top and provided with a pouring means, an upper brewing receptacle having a depending tubular member establishing communication with the lower receptacle, an intermediate member rotatably interposed between said receptacles around said tubular member and having continuous sealed contact at its upper and lower surfaces with both of said receptacles during the brewing process, said member having a projection to seal the mouth of the pouring means during the brewing process and rotatively movable in one direction to carry said projection out of sealing relation with the pouring means to permit pouring of coffee without shifting the sealing contact surfaces of the receptacles with said member out of contact with each other and means to yieldingly compress the said receptacles and said intermediate member into sealing contact.

6. A coffee brewing device comprising a lower receptacle open at the top and provided with a pouring means, an upper brewing receptacle having a communicating tube depending within the lower receptacle, an intermediate member movably interposed between said receptacles for covering and uncovering the pouring means and having continuous sealing contact with said receptacles around said tube during the brewing process, a filtering device in the upper receptacle, and means for holding the receptacles, the intermediate sealing member and the filtering device in operative relation during the brewing process and when pouring coffee through the pouring means.

7. A coffee brewing device comprising a lower receptacle open at the top and provided with a pouring means, an upper brewing receptacle having communication with the lower receptacle, an intermediate member movably interposed between said receptacles and having a projection normally sealing the mouth of the pouring means during the brewing process and movable away from the mouth of the pouring means to permit pouring of the brewed coffee without shifting the sealing contact surfaces out of contact with each other, a filtering device in the upper receptacle, and means having engagement with the filtering device and also having connection with the lower receptacle to hold the receptacles, the intermediate sealing member and the filtering device in operative relation during the brewing process and also when pouring coffee from the lower receptacle through the pouring means.

8. A coffee brewing device comprising a lower receptacle open at the top and provided with a pouring means extending laterally beyond said open top, an upper brewing receptacle provided with a depending open-ended tube extending into the lower receptacle, and an intermediate member interposed between said receptacles and having continuous sealing contact with said receptacles and pouring means during the brewing process, said intermediate member having an opening therein through which said tube extends and being movable to uncover the pouring means while closing the open top of the lower receptacle.

9. A coffee brewing device comprising a lower receptacle open at the top and provided with a pouring means, an upper brewing receptacle having a bottom provided with a depending annular bearing surface and also having a depending open-ended tube extending into the lower receptacle, and an intermediate sealing member interposed between said receptacles and with the upper face of which the annular bearing of the upper receptacle has continuous sealing contact, said intermediate member on its lower face having continuous sealing contact with the top of the lower receptacle and covering the pouring means during the brewing process, a filtering means in the upper receptacle through which filtering means and said tube communication is established between said receptacles, and means for retaining the receptacles and intermediate member in operative relation, said intermediate member being movable to uncover the pouring means while closing the open top of the lower receptacle.

10. A coffee brewing device comprising a lower receptacle provided with a pouring means, an upper brewing receptacle provided with an open-ended tube extending into the lower receptacle, an intermediate rotatable member interposed between said receptacles and having an opening therein through which said tube extends and means carried by said intermediate member and movable therewith into and out of position covering said pouring means.

11. A coffee brewing device comprising a lower receptacle provided with a pouring means, an upper brewing receptacle provided with an open-ended tube extending into the lower receptacle, an intermediate rotatable member interposed between said receptacles and having an opening therein and means movable therein to cover and uncover said pouring means, and a gasket mounted in said opening through which said tube extends, said tube having a tight fit in said gasket whereby to adjust the upper receptacle toward and away from the intermediate member and the lower receptacle.

12. A coffee brewing device comprising a lower receptacle provided with an open top and a pouring means opening laterally beyond said open top, a sealing member mounted on the top of said lower receptacle and carrying an open-ended tube depending therefrom into the lower receptacle, means carried by said member for covering and uncovering said pouring means, an upper brewing receptacle mounted on said member, said tube establishing communication between said receptacles, and means for holding the receptacles and said member together in operative relation.

13. A coffee brewing device comprising a lower receptacle open at the top and provided with a pouring means having its upper terminal edges arranged substantially coincident with the plane of the rim of the lower receptacle, a member seated upon the lower receptacle and having an opening therein, an upper brewing receptacle seated on said member and through the opening of the latter having communication with the lower receptacle, said member having a portion normally covering the mouth of the pouring means and said member having normal sealing engagement with said receptacles and said projecting portion normally sealing the mouth of the pouring means, the said member also having rotative movement between the receptacles to move said projection from over the mouth of the pouring means to permit the contents of the lower receptacle to be poured without removing the upper brewing receptacle.

14. A coffee brewing device comprising a lower receptacle open at the top and provided with a pouring means, a sealing member having upper and lower sealing surfaces and seated upon the lower receptacle and provided with a central opening and having a protuberance of lobe formation normally sealing the mouth of the pouring means, a sealing gasket fitted in the central opening of said sealing member and depending therefrom and provided at the upper end with a peripheral bead to seat upon said sealing member, an upper brewing receptacle provided at the bottom with a depending open-ended tube fitting tightly in and extending through said gasket and projecting into the lower receptacle, the sealing member being movable relative to the lower receptacle to unseal the mouth of the pouring means to permit the contents of the lower receptacle to be poured without removing the upper brewing receptacle and without breaking contact of said receptacles with said sealing member, a filtering means in the upper receptacle, and means for holding the receptacles, the sealing member and the filter means in cooperative relation during the brewing process and also when pouring coffee through the pouring means.

15. A coffee brewing device comprising a lower receptacle open at the top and provided with a pouring means, an upper brewing receptacle, an intermediate member movably interposed between the upper and lower receptacles, the latter having communication with each other and said member having sealing contact surfaces disposed in continuous sealing contact relation with said receptacles and the pouring means during the brewing process, said intermediate member being movable at will to break the sealed contact engagement thereof at the pouring means to permit pouring of the brewed coffee from the lower receptacle through said pouring means and without shifting the sealing contact relation of the intermediate member out of sealed contacting relation with said receptacles other than at the pouring means, a filtering means arranged in the line of communication between said receptacles and means to yieldingly compress the upper and lower receptacles and said intermediate member into sealing engagement.

16. A coffee brewing device comprising a lower receptacle open at the top and provided with a pouring means, an upper brewing receptacle, an intermediate movable sealing member with which said receptacles and the pouring means have continuous sealing contact and through which intermediate sealing member the receptacles have communication with each other, said intermediate sealing member being movable at will to break the sealed contact thereof with said pouring means to permit pouring of the brewed coffee from the lower receptacle through the pouring means without breaking the sealed contacting relation of the intermediate member with said receptacles other than at said pouring means, a filtering means located in the line of the communication between the receptacles and means to yieldingly compress the upper and lower receptacles and said intermediate member into sealing engagement.

17. A coffee brewing device comprising a lower receptacle open at the top and provided with a pouring means, an upper brewing receptacle, an intermediate movable sealing member with which said receptacles and the pouring means have continuous sealing contact and through which member said receptacles have communication with each other, means for holding the receptacles in sealed relation during the brewing process, said intermediate member being movable at will on the lower receptacle against the holding action of said holding means to break the sealed contact thereof with the pouring means to permit pouring of the brewed coffee from the lower receptacle through the pouring means without breaking the sealed contacting relation of the intermediate member with said receptacles other than at said pouring means and without removing said holding means from the device, and a filtering means arranged in the line of the communication between the receptacles.

18. A steam, vacuum coffee brewing device comprising upper and lower receptacles of which the lower receptacle is provided with pouring means, and a member shiftable therebetween having means for covering and uncovering said pouring means and also forming a seal between the receptacles continuously during the brewing operation and during pouring from the said pouring means while the upper receptacle is in place.

19. A steam, vacuum coffee brewing device comprising a lower receptacle having pouring means projecting laterally beyond its upper end, an upper receptacle having a tubular member depending within the lower receptacle, and an adjustable member between said receptacles having means presenting sealing contact with both receptacles and having laterally projecting means movable to cover and uncover the pouring means.

20. A steam, vacuum brewing device comprising a lower receptacle having an upwardly opening pouring spout extending laterally beyond its upper end, an upper receptacle, a tubular member depending into the lower receptacle and establishing communication between said receptacles, and an intermediate member supporting the upper receptacle and seated on the lower receptacle in sealing contact therewith around said tubular member, said intermediate sealing member being rotatably adjustable while in sealing contact with the receptacles and having outstanding means movable therewith to cover and uncover said pouring spout.

21. A steam, vacuum coffee brewing device comprising upper and lower receptacles, a pouring spout carried by the lower receptacle, a member between and in sealing contact with said receptacles and having means by which it may be rotatably shifted while maintaining such sealing contact, means for holding the receptacles and the said intermediate member against accidental displacement, and means carried by the intermediate member and shiftable therewith for covering and uncovering the said pouring spout.

22. A steam, vacuum coffee brewing device comprising a lower fluid receptacle open at its top and having a pouring means, a member disposed on, and having sealing contact with, the open top of the lower receptacle and movable with respect thereto for covering the pouring means in one position and uncovering the same in another position, an upper coffee receptacle on said member and in communication with the lower fluid receptacle through said member, and means for holding the upper receptacle and said member from accidental displacement with respect to the lower receptacle, whereby when said member is moved to uncover the pouring means, both receptacles may be tilted as a unit for pouring fluid from the pouring means of the lower receptacle.

23. A steam, vacuum coffee brewing device comprising a lower fluid receptacle open at its top and having a pouring means adjacent to said open top, an upper coffee receptacle having means for sealing contact with the upper edge of the lower receptacle and, during the brewing operation, with the said pouring means, and movable while in sealing contact with the said upper edge of the lower receptacle to uncover the said pouring means, a tubular member depending in the lower receptacle for transferring fluid to and fro between the upper and lower receptacles, and means for holding the upper receptacle and its sealing means against accidental displacement relative to the lower receptacle whereby when the pouring means are uncovered the two receptacles may be tilted as a unit to pour from the said pouring means of the lower receptacle.

CONDICT M. NEVIUS.

CERTIFICATE OF CORRECTION.

Patent No. 2,158,587.  May 16, 1939.

CONDICT M. NEVIUS.

It is hereby certified that error appears in the printed specification of the above numbered patent requiring correction as follows: Page 3, second column, line 64, for "poistion" read position; page 5, second column, line 12, claim 11, for "movable therein" read movable therewith; and that the said Letters Patent should be read with this correction therein that the same may conform to the record of the case in the Patent Office.

Signed and sealed this 4th day of July, A. D. 1939.

(Seal)

Henry Van Arsdale
Acting Commissioner of Patents.